United States Patent
Zukerman et al.

(10) Patent No.: US 9,769,073 B2
(45) Date of Patent: Sep. 19, 2017

(54) SYSTEM AND METHOD FOR TRANSMITTING DATA IN A NETWORK

(71) Applicant: City University of Hong Kong, Kowloon (HK)

(72) Inventors: Moshe Zukerman, Kowloon (HK); Eric Wing-Ming Wong, Kowloon (HK); Meiqian Wang, Kowloon (HK); Shuo Li, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 187 days.

(21) Appl. No.: 13/870,313

(22) Filed: Apr. 25, 2013

(65) Prior Publication Data

US 2014/0321847 A1    Oct. 30, 2014

(51) Int. Cl.
*H04B 10/08*    (2006.01)
*H04L 12/801*   (2013.01)
*H04L 12/825*   (2013.01)

(52) U.S. Cl.
CPC .............. *H04L 47/11* (2013.01); *H04L 47/26* (2013.01); *H04Q 2213/13164* (2013.01); *H04Q 2213/13166* (2013.01)

(58) Field of Classification Search
None
See application file for complete search history.

(56) References Cited

U.S. PATENT DOCUMENTS

| | | | |
|---|---|---|---|
| 5,719,853 A * | 2/1998 | Ikeda | 370/229 |
| 5,936,940 A * | 8/1999 | Marin et al. | 370/232 |
| 5,982,780 A * | 11/1999 | Bohm et al. | 370/450 |
| 2003/0189901 A1* | 10/2003 | Ozugur et al. | 370/230 |
| 2004/0264377 A1* | 12/2004 | Kilkki | H04L 47/10 370/235 |
| 2012/0148242 A1* | 6/2012 | Chen et al. | 398/49 |
| 2013/0094856 A1* | 4/2013 | Chen | 398/48 |
| 2014/0321287 A1* | 10/2014 | Zukerman et al. | 370/237 |

* cited by examiner

*Primary Examiner* — Ken N Vanderpuye
*Assistant Examiner* — David Lambert
(74) *Attorney, Agent, or Firm* — Renner Kenner Greive Bobak Taylor & Weber

(57) ABSTRACT

A system and method for transmitting data in a network comprising the steps of determining a traffic congestion variable of a data transmission node arranged to receive data from one or more source nodes of the network, using the traffic congestion variable to select a preferred transmission mode for use by the one or more source nodes to transmit data to the data transmission node, and switching an operating transmission mode of each of the one or more source nodes to the preferred transmission mode such that the one of more source nodes transmit data to the data transmission node with the preferred transmission mode.

6 Claims, 4 Drawing Sheets

SYSTEM AND METHOD FOR TRANSMITTING DATA IN A NETWORK

TECHNICAL FIELD

The present invention relates to a system and method for transmitting data in a network and particularly, although not exclusively, to a dual mode data transmission system and method for transmitting data in optical networks.

BACKGROUND

With an ever increasing data traffic in data transmission networks such as the Internet, efficient and reliable data transmission is highly desirable for handling and communicating a large amount of data. To date, different data transmission methods have their own advantages and limitations. For example, some data transmission methods may be faster in speed whilst some other data transmission methods may be less susceptible to data transmission loss.

Choosing which method to use in the right instances would be helpful in establishing an efficient communication transmission network. This, in turn, may improve the efficiency of data transmission in the network and hence provides additional flexibility and enhanced cost-effectiveness to the data transmission system.

SUMMARY OF THE INVENTION

In accordance with a first aspect of the present invention, there is provided a method for transmitting data in a network comprising the steps of determining a traffic congestion variable of a data transmission node arranged to receive data from one or more source nodes of the network; using the traffic congestion variable to select a preferred transmission mode for use by the one or more source nodes to transmit data to the data transmission node; and switching an operating transmission mode of each of the one or more source nodes to the preferred transmission mode such that the one of more source nodes transmit data to the data transmission node with the preferred transmission mode.

In an embodiment of the first aspect, the operating transmission mode is switched to the preferred transmission mode when the preferred transmission mode is different to the operating transmission mode.

In an embodiment of the first aspect, the preferred transmission mode is selected by comparing the traffic congestion variable with at least one predetermined threshold.

In an embodiment of the first aspect, the preferred transmission mode is selected based on the traffic congestion variable being above or below the at least one predetermined threshold.

In an embodiment of the first aspect, the operating transmission mode and the preferred transmission mode includes an optical burst switching (OBS) mode or an optical circuit switching (OCS) mode.

In an embodiment of the first aspect, the at least one predetermined threshold comprises a congestion threshold and a recovery threshold.

In an embodiment of the first aspect, the OCS mode is selected for use by the one or more source nodes when the traffic congestion variable is above the congestion threshold.

In an embodiment of the first aspect, the OBS mode is selected for use by the one or more source nodes when the traffic congestion variable is below the recovery threshold.

In an embodiment of the first aspect, the congestion threshold is larger than or equal to the recovery threshold.

In an embodiment of the first aspect, the congestion threshold and the recovery threshold are predetermined.

In an embodiment of the first aspect, the data transmission node is arranged to transmit data in both optical burst switching (OBS) mode and optical circuit switching (OCS) mode.

In an embodiment of the first aspect, the method for transmitting data in a network further comprises a step of communicating a switching signal to the one or more source nodes to switch the one or more source nodes to the preferred transmission mode.

In an embodiment of the first aspect, each source node is arranged to switch its operating transmission mode based on the traffic congestion variables of one or more data transmission nodes.

In accordance with a second aspect of the present invention, there is provided a system for transmitting data in a network comprising a controller arranged to determine a traffic congestion variable of a data transmission node arranged to receive data from one or more source nodes of the network; a selection module arranged to select a preferred transmission mode based on the traffic congestion variable for use by the one or more source nodes to transmit data to the data transmission node; and a switching module arranged to switch an operating transmission mode of each of the one or more source nodes to the preferred transmission mode such that the one of more source nodes transmit data to the data transmission node with the preferred transmission mode.

In an embodiment of the second aspect, the switching module switches the operating transmission mode to the preferred transmission mode when the preferred transmission mode is different to the operating transmission mode.

In an embodiment of the second aspect, the selection module selects the preferred transmission mode by comparing the traffic congestion variable with at least one predetermined threshold.

In an embodiment of the second aspect, the selection module selects the preferred transmission mode based on the traffic congestion variable being above or below the at least one predetermined threshold.

In an embodiment of the second aspect, the operating transmission mode and the preferred transmission mode includes an optical burst switching (OBS) mode or an optical circuit switching (OCS) mode.

In an embodiment of the second aspect, the at least one predetermined threshold comprises a congestion threshold and a recovery threshold.

In an embodiment of the second aspect, the selection module selects the OCS mode for use by the one or more source nodes when the traffic congestion variable is above the congestion threshold.

In an embodiment of the second aspect, the selection module selects the OBS mode for use by the one or more source nodes when the traffic congestion variable is below the recovery threshold.

In an embodiment of the second aspect, the congestion threshold is larger than or equal to the recovery threshold.

In an embodiment of the second aspect, the congestion threshold and the recovery threshold are predetermined.

In an embodiment of the second aspect, the data transmission node is arranged to transmit data in both optical burst switching (OBS) mode and optical circuit switching (OCS) mode.

In an embodiment of the second aspect, the system for transmitting data further comprises a communication module arranged to communicate a switching signal to the one or more source nodes to switch the one or more source nodes to the preferred transmission mode.

In an embodiment of the second aspect, the switching module is arranged to switch the operating transmission mode of each source node based on the traffic congestion variables of one or more data transmission nodes.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The applicant has devised, through experimentation and trials, that optical burst switching (OBS) is an optical networking technology that facilitates one-way dynamic resource (e.g. wavelength channels) reservation of data flows suited to all-optical networks whereas optical circuit switching (OCS) and optical flow switching (OFS) are optical networking technologies in which end-to-end network resources are reserved in advance so that the data transmitted in the network will always be able to reach their destinations.

In OBS networks, data that are to be transmitted to the same destination are aggregated at ingress (source) nodes to form bursts. A burst may include data from various sources (when OBS operates at the core network) or from a single source (when OBS operates end-to-end). Control packet or signal is sent ahead of a burst to reserve wavelength channels along the burst transmission path in a hop by hop manner.

Since the wavelength channels are reserved hop by hop in OBS, the resource reservation time required prior to initiating data transmission is generally shorter than in end-to-end channel reservation schemes such as OCS. Preferably, OBS can be used to provide bandwidth on demand when fast setup time is needed. Another benefit of OBS over OCS is that in OBS light-paths are fully utilized during burst transmission whereas in OCS these light-paths may not be fully utilized.

In OBS, however, a burst of data, after utilizing certain network resources, may be dumped as a result of congestion in the network and never reaches the destination. The utilization of resources (e.g. wavelength channels) by the bursts that will eventually be blocked or dumped during the transmission process represents utilized network resources that do not lead to network throughput. This has a detrimental effect on the network as these wasted resources can otherwise be used by other bursts. In OCS networks, the channels are used by the traffic or bursts that will certainly reach the destination and therefore no utilized resources are wasted. The problem in which some resources utilized by the bursts will eventually be dumped and failed to reach the destination is a peculiar weakness of OBS networks. Furthermore, an overloaded or congested trunk in a network will cause problems to other neighbouring trunks. This may in turn cause the other trunks to become congested and hence the reliability and efficiency of data transmission will be compromised.

Figure 1:
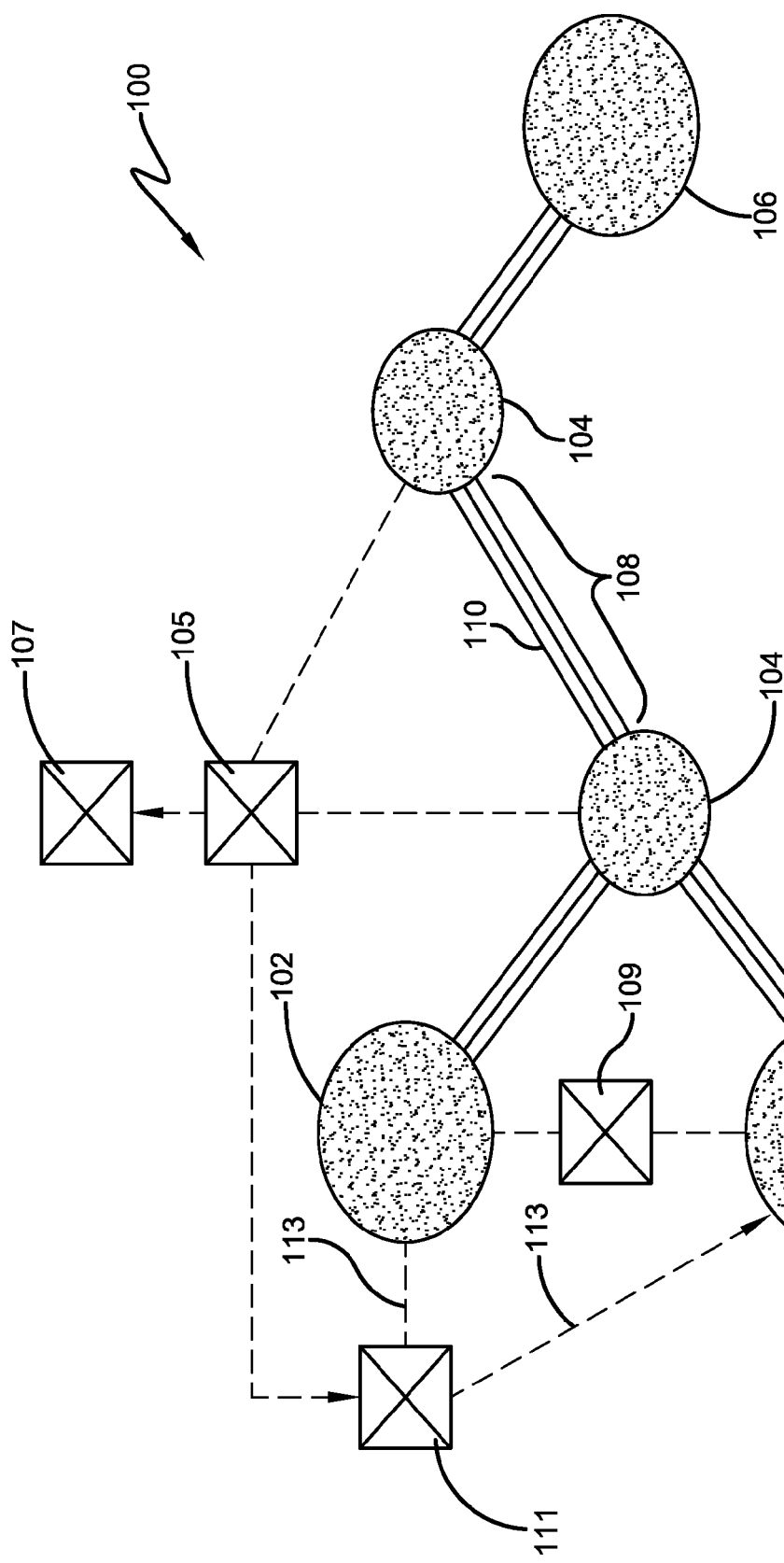
FIG. 1 shows an exemplary 5-node network arranged to use a data transmission method for transmitting data in one embodiment of the present invention.

Referring now to FIG. 1, there is shown an exemplary 5-node network 100 arranged to use a data transmission method for transmitting data in one embodiment of the present invention. The method comprising the steps of determining a traffic congestion variable of a data transmission node arranged to receive data from one or more source nodes of the network; using the traffic congestion variable to select a preferred transmission mode for use by the one or more source nodes to transmit data to the data transmission node; and switching an operating transmission mode of each of the one or more source nodes to the preferred transmission mode such that the one of more source nodes transmit data to the data transmission node with the preferred transmission mode.

As shown in FIG. 1, the exemplary network 100 comprises two source nodes 102, two data transmission nodes 104 and a destination node 106. These nodes are connected to one another through trunks 108 having a plurality of channels 110. During operation of the network, data is transmitted from the source nodes 102 to the destination nodes 106 through the intermediate data transmission nodes 104. In some embodiments, the data transmission nodes 104 may be arranged to transmit or receive data from different source nodes 102 at the same time. In other words, the trunk 108 of the data transmission nodes 104, at any particular time, may be transmitting data that originates from different source nodes 102. Preferably, all the nodes in the network 100 are arranged and adapted to transfer data in a plurality of data transmission modes. These data transmission modes may include optical circuit switching (OCS), optical burst switching (OBS), optical flow switching (OFS) or any other optical or electrical data transmission modes.

In a preferred embodiment, the nodes in the network as shown in FIG. 1 are arranged to transmit data using both OBS and OCS modes so as to provide an optimal data transmission performance. Preferably, the network 100 of FIG. 1 has a network congestion control that switches the data transmission modes at the source nodes 102 depending on the traffic in the data transmission nodes. In a preferred embodiment, the source nodes 102 use OCS mode to transmit data when the traffic in the network 100 or the data transmission nodes 104 is congested. OBS mode is used when the traffic in the network 100 or the data transmission nodes 104 is low.

In one embodiment, the data transmission node 104 is arranged to determine a congestion variable relating to its own traffic condition. The traffic congestion variable may be related to the channel 110 utilization of the data transmission node 104, the processing time required at the data transmission node 104, etc. The determination of the variable may be performed by a controller 105 associated with the data transmission nodes 104. In other embodiments, the controller 105 may be external or the determination of the variable may be performed by other modules or units associated with the nodes.

The determined traffic congestion variable is then compared with at least one threshold value to determine if data transmission mode switching is required at the source nodes 102. This step can be performed by the controller 105 at the data transmission nodes 104 or a separate controller 105 located externally or in other nodes. In one embodiment, a preferred transmission mode will be selected based on the traffic congestion variable by a selection module 107. In a preferred embodiment, the threshold values comprise a congestion threshold indicating that the channels 110 are congested and a recovery threshold indicating that the channels 110 are not fully utilized.

Preferably, the value of the congestion threshold is larger than or equal to that of the recovery threshold. Also, the thresholds are preferably predetermined. In some other embodiments, there may be any number of thresholds or the thresholds may be dynamically adjusted. The use of two thresholds is advantageous over the use of a single threshold in that it prevents excessive and unnecessary rapid switching of transmission mode in the source nodes 102 due to periodic small traffic fluctuation about the threshold value. This prevents inducing unnecessary damages to the switching modules or the nodes.

In an embodiment, if it is determined that the traffic congestion variable exceeds the congestion threshold, a switching signal 113 will be communicated to the source nodes 102 that use the trunk 108 of the data transmission node 104 to switch the data transmission mode of these source nodes 102 to OCS. On the other hand, if it is determined that the traffic congestion variable falls below the recovery threshold, a switching signal 113 will be communicated to the source nodes 102 that use the trunk 108 of the data transmission node to switch the data transmission mode of these source nodes 102 to OBS. Preferably, the communication of the switching signal 113 to the source nodes 102 is performed by a communication module 111 associated with the system or the nodes.

The source nodes 102, upon receiving the switching signal 113, will switch to the preferred transmission mode. In these cases, the switching may be performed by a switching module 109 associated with the source nodes 102. In some embodiments, the source nodes 102 may be arranged to receive switching signals 113 from more than one transmission nodes 104. Preferably, the data transmission mode of the source nodes 102 will be switched if the present operating transmission mode is different to the data transmission mode indicated by the switching signal 113. The data that are sent from the source nodes 102 after the source nodes receive the switching signal may also be transmitted using the preferred transmission mode. The transmission mode of the data that are already being transmitted in the network before the source nodes 102 receive the switching signal 113 will be substantially unaffected.

In operation, when the utilization of the trunk 108 of a transmission node 104 exceeds the congestion threshold, a switching signal will be sent to all the source nodes 102 that use the trunk and turn the transmission mode of these source nodes into OCS. The bursts that are sent from these source nodes 102 after the source nodes receive the switching signal will be transmitted in OCS mode and control packets will be sent end-to-end to reserve channels 110 for the bursts. The bursts that are already being transmitted in the nodes before the source nodes 102 receive the switching signal will remain to be transmitted hop by hop using OBS mode. Preferably, the bursts that are being sent by the other source nodes will not be affected. This embodiment is particularly advantageous as the two data transmission modes, OBS and OCS, will exist in the network at the same time.

As mentioned earlier, The bursts that are transmitted in OCS mode will not occupy the channels 110 until an end-to-end channel reservation is established. This prevents the bursts that will eventually be dumped during the transmission process from using the channels 110 and in turn reduces the load for the congested trunk 108. As a result, the utilization of the congested trunks will be gradually decreased until the traffic congestion variable falls below the recovery threshold. This implies that the network or the transmission nodes are no longer congested. A switching signal may then be sent to all the source nodes 102 that use the trunks 108 to turn the transmission mode in these source nodes back into OBS. In this way, the network will have an improved transmission speed or enhanced reliability when compared to using either one of OBS or OCS for data transmission.

Although a 5-node network 100 using the data transmission method in an embodiment of the present invention is shown in FIG. 1, it should be understood that the method as illustrated can be implemented on other networks having any number of nodes or of different node arrangements. Also, the number and position of the source nodes, data transmission nodes and destination nodes can be freely chosen and arranged.

Figure 2:
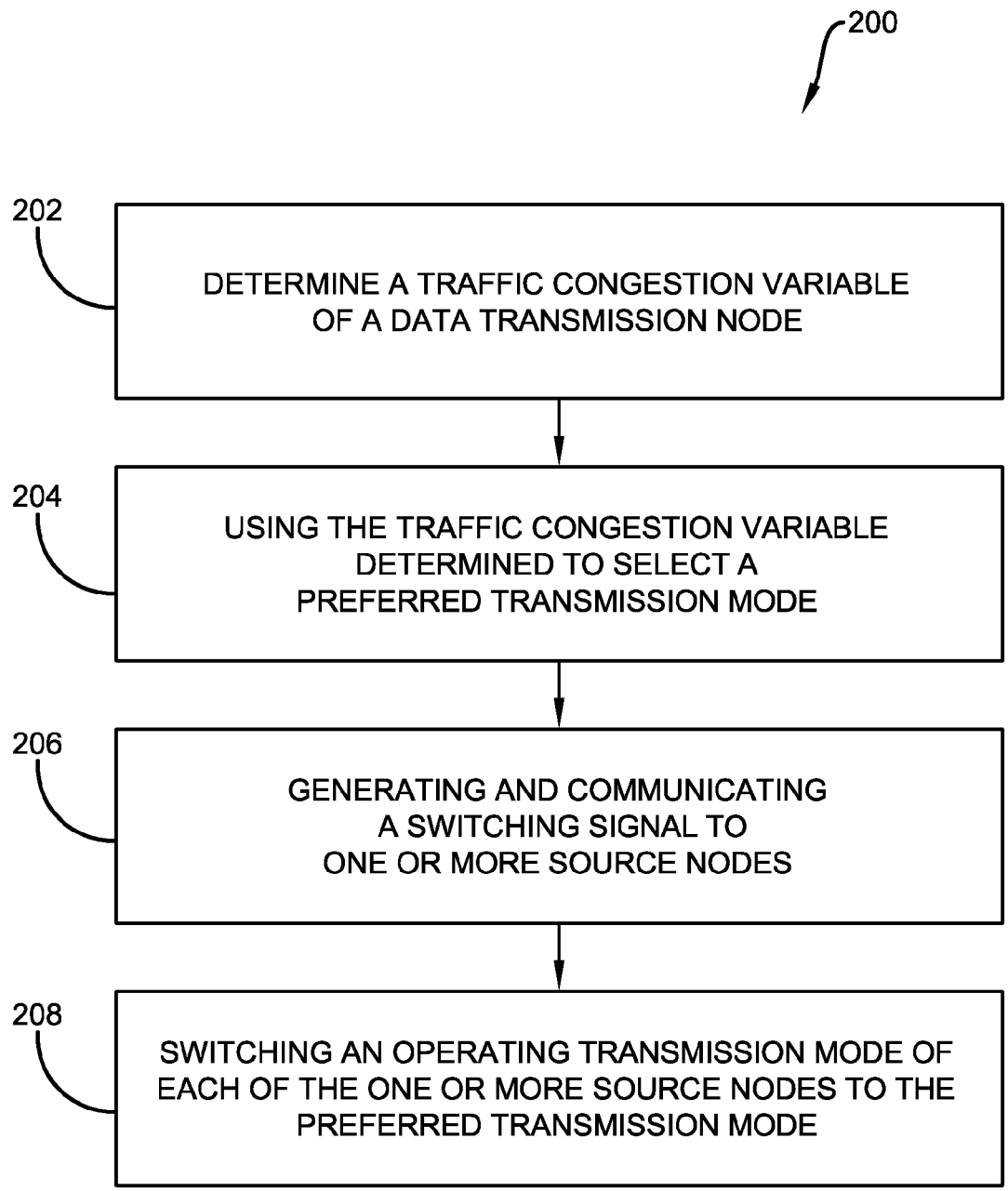
FIG. 2 shows the data transmission method used by the network for FIG. 1.

FIG. 2 shows the method 200 for transmitting data used by the network of FIG. 1. In this method 200, firstly, a traffic congestion variable indicating the utilization of a data transmission node is determined 202. Preferably, each data transmission node has its own traffic congestion variable. The traffic congestion variable determined is then used to select a preferred transmission mode from OBS and OCS modes 204. Particularly, the selection of the preferred transmission mode is based on comparing the traffic congestion variable with a congestion threshold and a recovery threshold. OCS mode is selected when the variable exceeds the congestion threshold and OBS mode is selected when the variable falls below the recovery threshold.

Upon determining or selecting the preferred transmission mode, a switching signal indicating the preferred transmission mode may be generated and communicated to the source nodes that are utilizing the data transmission node 206. In some embodiments, the switching signal may be generated at the source nodes and thus no communication of the switching signal to the source nodes are required. The switching signal commands the source nodes to switch their data transmission mode to the preferred transmission mode. In response to the switching signal, the data transmission mode of these source nodes is switched to the preferred data transmission mode when the operating transmission mode of these source nodes are different to the preferred transmission mode 208.

Figure 3:
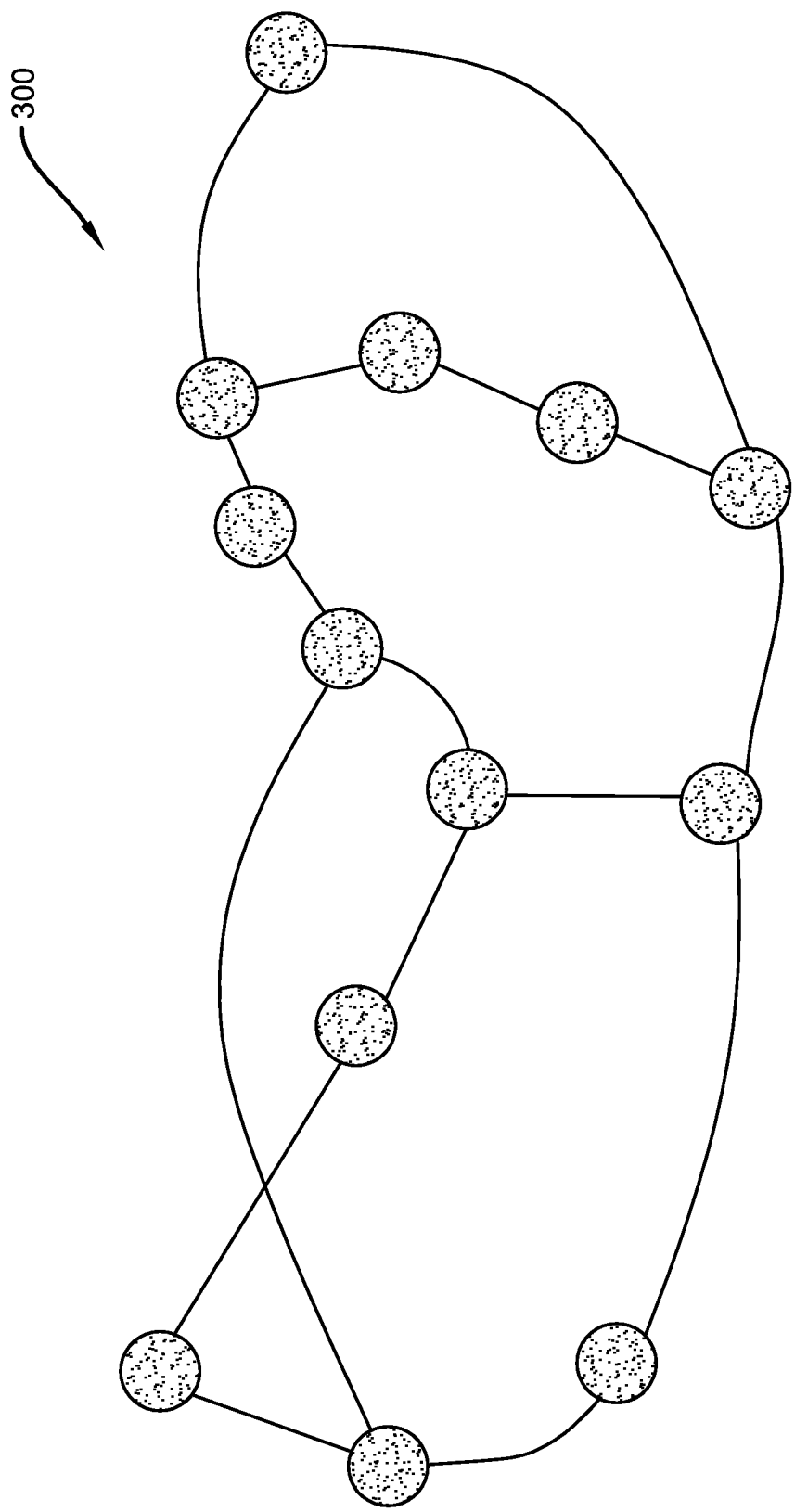
FIG. 3 shows an exemplary 13-node NSFNet network topology arranged to use the data transmission method of FIG. 2; and, FIG. 4 is a graph showing the network throughput for the network of FIG. 3 with 50 channels per trunk at different data transmission modes.
Figure 4:
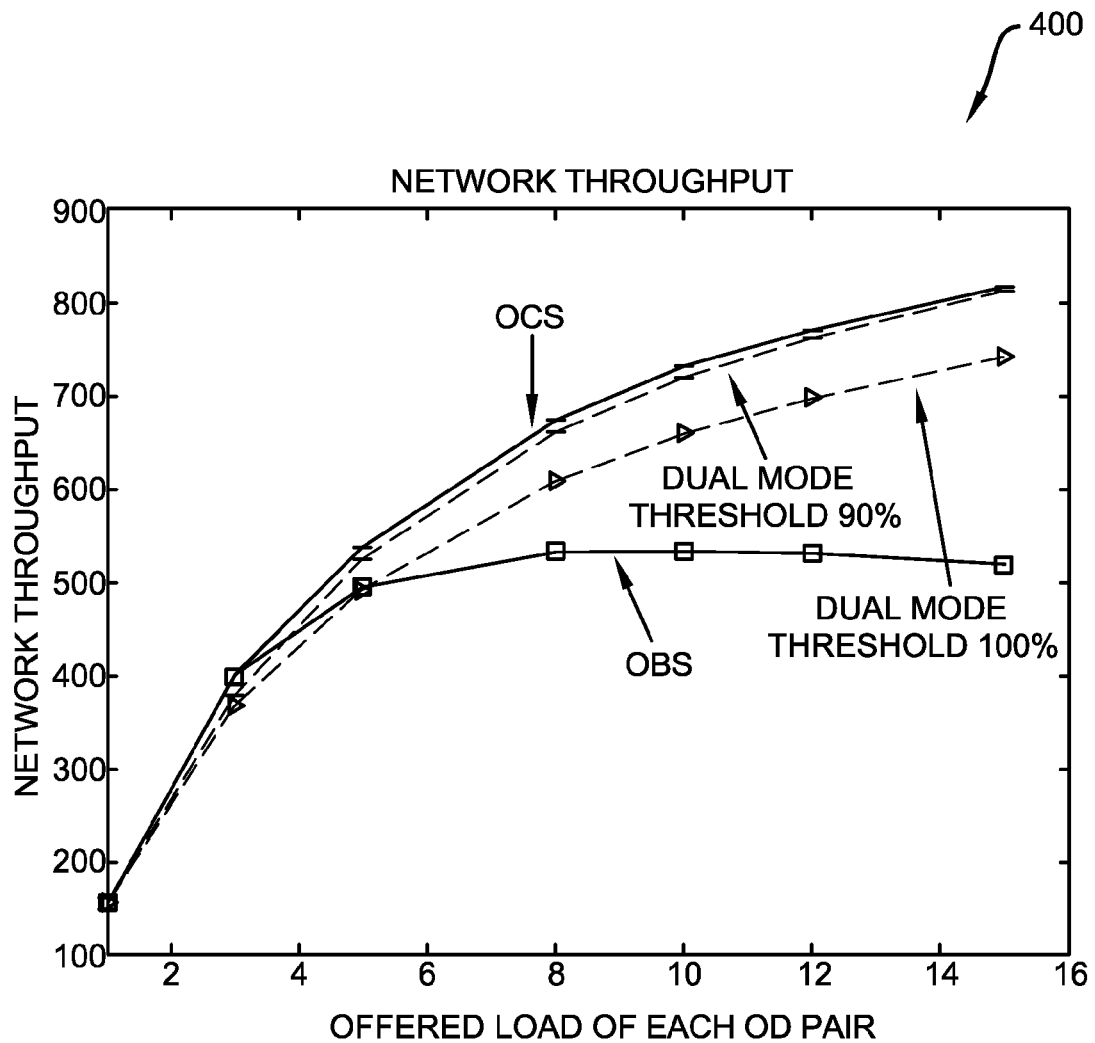

Turning now to FIG. 3, an exemplary 13-node NSFNet network topology 300 as shown is used to illustrate the performance of the dual mode data transmission method 200 of FIG. 2. By choosing all possible origin-destination pairs with shortest path routing where a tie is broken randomly, a graph 400 showing the network throughput for the network 300 of FIG. 3 with 50 channels per trunk at different data transmission modes is shown in FIG. 4. In FIG. 4, performance of different sets of congestion and recovery thresholds used in the dual mode model are compared.

As shown in FIG. 4, when the network 300 is underloaded and the probability of blocking (data loss) is negligible, the network throughput is about the same for OBS and OCS. As the offered load (traffic) increases, blocking probability increases in OBS. This leads to congestion collapse of network throughput. On the other hand, in OCS where no resources are used for the traffic that will eventually be lost or dumped during the transmission process, the network resources are utilized more efficiently albeit the data transmission speed may be slower.

In an embodiment of the data transmission method of the present invention, the bursts are transmitted in OBS mode when the utilization of the nodes or network 300 is smaller than the recovery threshold and OCS mode when the utilization of the nodes or network 300 exceeds the congestion threshold. As such, the throughput of the dual mode transmission network 300 is expected to be close to that of OCS whereas the data transmission speed is expected to improve when compared to using only OCS mode.

As shown in FIG. 4, when the congestion and recovery thresholds are both set to 90%, the network throughput is comparable to that of using OCS. On the other hand, when the congestion and recovery thresholds are both set to 100%, the network throughput is between that of OBS and OCS. This can be explained by that more bursts are being transmitted in OCS mode when the thresholds are at 90% than when they are at 100%. The network throughput of that when the thresholds are both set to 90% is therefore closer to the performance of OCS.

It should be noted, however, that how close the network throughput in the preferred embodiment of the dual mode transmission illustrated in the present invention to that of OCS is dependent on the proportion of bursts being transmitted in OCS mode, which in turn depends on the settings of the recovery and congestion thresholds. Particularly, the more the proportion of bursts is transmitted in OCS mode, the closer the network throughput will be to that of OCS.

Tables 1, 2 and 3 below show the effect of choosing different values for the recovery and congestion thresholds on network throughput and on the proportions of bursts that are transmitted in OBS and OCS modes for the exemplary network 300.

TABLE 1

Network throughput (Erlangs) for different thresholds
Network throughput (Erlangs)

| | Offered load(Erlangs) | | | | | | |
|---|---|---|---|---|---|---|---|
| | 1 | 3 | 5 | 8 | 10 | 12 | 15 |
| A. recovery threshold = 70 congestion threshold = 90 | 155.9294 | 399.9649 | 535.5494 | 669.8019 | 726.6679 | 768.6698 | 812.8134 |
| B. recovery threshold = 90 congestion threshold = 90 | 155.9267 | 378.8076 | 524.2964 | 659.8142 | 718.1768 | 763.7998 | 810.2687 |
| C. recovery threshold = 90 congestion threshold = 95 | 155.9765 | 377.4525 | 522.0722 | 656.7204 | 715.8017 | 760.4236 | 808.9138 |

TABLE 2

Proportions of bursts that are transmitted in OBS mode
Proportions of bursts that are transmitted in OBS mode

| | Offered load(Erlangs) | | | | | | |
|---|---|---|---|---|---|---|---|
| | 1 | 3 | 5 | 8 | 10 | 12 | 15 |
| A. recovery threshold = 70 congestion threshold = 90 | 0.9960 | 0.3806 | 0.2010 | 0.0586 | 0.0239 | 0.0123 | 0.0052 |
| B. recovery threshold = 90 congestion threshold = 90 | 0.9979 | 0.5448 | 0.3173 | 0.1532 | 0.0940 | 0.0598 | 0.0325 |
| C. recovery threshold = 90 congestion threshold = 95 | 0.9996 | 0.5823 | 0.3580 | 0.1917 | 0.1258 | 0.0847 | 0.0492 |

TABLE 3

Proportions of bursts that are transmitted in OCS mode
Proportions of bursts that are transmitted in OCS mode

| | Offered load(Erlangs) | | | | | | |
|---|---|---|---|---|---|---|---|
| | 1 | 3 | 5 | 8 | 10 | 12 | 15 |
| A. recovery threshold = 70 congestion threshold = 90 | 0.0040 | 0.6194 | 0.7990 | 0.9414 | 0.9761 | 0.9877 | 0.9948 |

TABLE 3-continued

Proportions of bursts that are transmitted in OCS mode
Proportions of bursts that are transmitted in OCS mode

| | Offered load(Erlangs) | | | | | | |
|---|---|---|---|---|---|---|---|
| | 1 | 3 | 5 | 8 | 10 | 12 | 15 |
| B. recovery threshold = 90 congestion threshold = 90 | 0.0021 | 0.4552 | 0.6827 | 0.8468 | 0.9060 | 0.9402 | 0.9675 |
| C. recovery threshold = 90 congestion threshold = 95 | 0.0004 | 0.4177 | 0.6420 | 0.8083 | 0.8742 | 0.9153 | 0.9508 |

As shown in Tables 1, 2 and 3, when the offered load is 1 erlang, the network 300 is under-loaded and the throughput of OBS and OCS are almost the same. Therefore, the throughputs of the dual mode network 300 with different threshold settings do not have much difference. When the offered load is equal to or more than 3 erlangs, the network 300 becomes congested and about half of the total number of bursts is transmitted in OCS mode (as shown in Tables 2 and 3). This leads to a more obvious difference in network throughputs. As setting A (recovery threshold: 70 & congestion threshold: 90) uses OCS mode more frequently than setting B (recovery threshold: 90 & congestion threshold: 90) than setting C (recovery threshold: 90 & congestion threshold: 95), more bursts are being transmitted in OCS mode in setting A than setting B than setting C. Therefore, the network throughput is larger for setting A than setting B than setting C. Tables 1, 2 and 3 illustrate that the design of the thresholds is a trade-off between speed and reliability (less data loss). For a higher reliability, the bursts should be transmitted more in OCS mode. For faster data transmission, the bursts should be transmitted more in OBS mode.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for regulating data communication in a data communication network comprising the steps of:
  determining, in the data communication network, a traffic congestion variable of a data transmission node with channels arranged to receive data from a plurality of source nodes the plurality of source nodes being arranged to transmit data to the data transmission node using, selectively and exclusively, an optical burst switching mode and an optical circuit switching mode, and the traffic congestion variable being a measure of utilization of the channels of the data transmission node;
  comparing the determined traffic congestion variable with a congestion threshold;
  comparing the determined traffic congestion variable with a recovery threshold smaller than the congestion threshold;
  switching all source nodes that are utilizing the channels of the data transmission node and are operating in optical circuit switching mode from the optical circuit switching mode to the optical burst switching mode for subsequent data transmission when the determined traffic congestion variable changes from above the recovery threshold to below the recovery threshold; and
  switching all source nodes that are utilizing the channels of the data transmission node and are operating in the optical burst switching mode from the optical burst switching mode to the optical circuit switching mode for subsequent data transmission when the determined traffic congestion variable changes from below the congestion threshold to above the congestion threshold.

2. The method in accordance with claim 1, wherein the congestion threshold and the recovery threshold are predetermined.

3. The method in accordance with claim 1, further comprising a step of:
  communicating switching signals to the respective source nodes to perform the switching steps.

4. The method in accordance with claim 1, wherein each source node is arranged to switch its operating transmission mode based on the traffic congestion variables of one or more data transmission nodes.

5. A data communication network, comprising:
  a data transmission node with channels arranged to receive data from a plurality of source nodes:
  the plurality of source nodes being arranged to transmit data to the date transmission node through the channels using, selectively and exclusively, an optical burst switching mode and an optical circuit switching mode;
  a controller arranged to determine a traffic congestion variable of the data transmission node, the traffic congestion variable being a measure of utilization of the channels of the data transmission node;
  a comparator arranged to compare the determined traffic congestion variable with a congestion threshold and with a recovery threshold smaller than the congestion threshold; and
  a switching module arranged to:
    (i) switch all source nodes that are utilizing the channels of the data transmission node and are operating in optical circuit switching mode from the optical circuit switching mode to the optical burst switching mode for subsequent data transmission when the determined traffic congestion variable changes from above the recovery threshold to below the recovery threshold; and
    (ii) switch all source nodes that are utilizing the channels of the data transmission node and are operating in the optical burst switching mode from the optical burst switching mode to the optical circuit switching mode for subsequent data transmission when the determined traffic congestion variable changes from below the congestion threshold to above the congestion threshold.

6. The data communication network in accordance with claim 5, wherein the congestion threshold and the recovery threshold are predetermined.

* * * * *